Feb. 25, 1969     J. MERKWACZ     3,429,592
REINFORCED EXPANSION JOINT
Filed Sept. 11, 1967
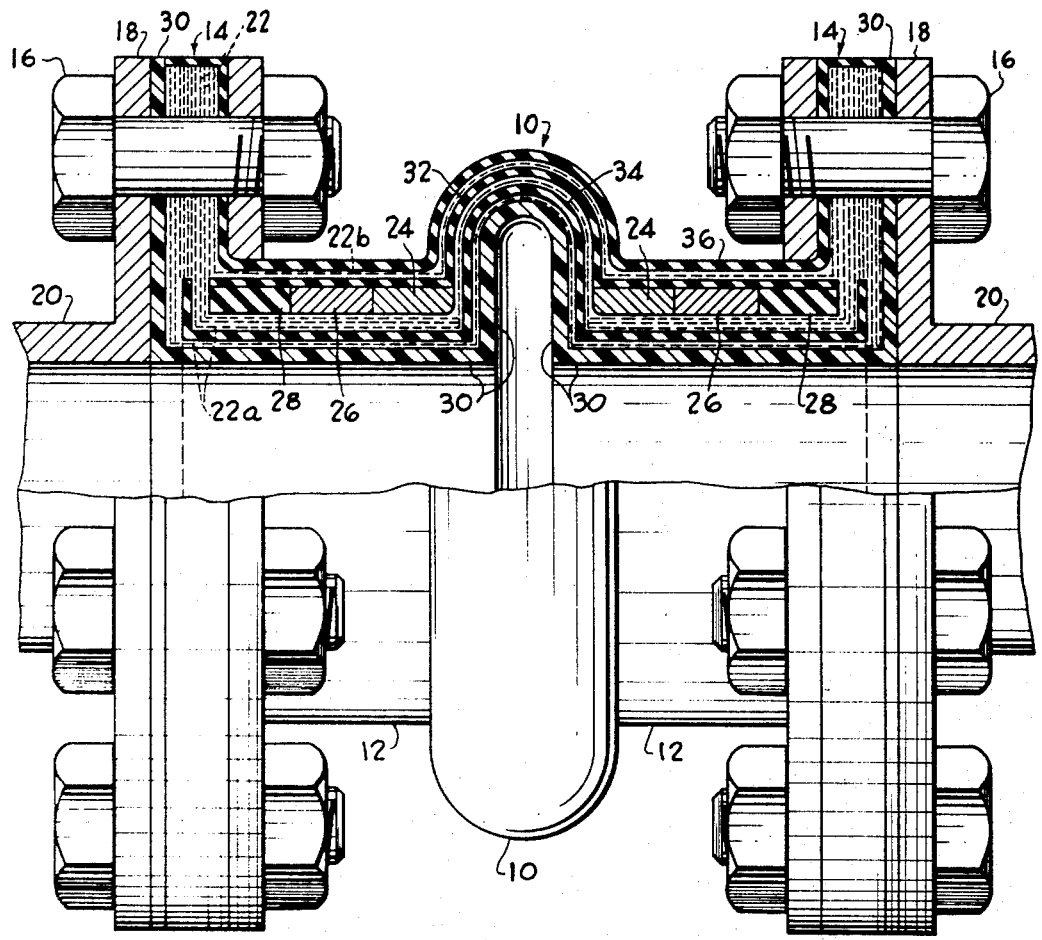
INVENTOR:
Joseph Merkwacz
BY Robert Henderson
ATTORNEY

United States Patent Office 3,429,592
Patented Feb. 25, 1969

3,429,592
REINFORCED EXPANSION JOINT
Joseph Merkwacz, Penfield, N.Y., assignor to Garlock Inc., Palmyra, N.Y., a corporation of New York
Filed Sept. 11, 1967, Ser. No. 666,745
U.S. Cl. 285—229                  5 Claims
Int. Cl. F16l 27/10, 51/02

ABSTRACT OF THE DISCLOSURE

Cylindrical portions of an expansion joint, between which an expansion arch is integrally connected, are each provided with reinforcing means in the form of a pair of strong (preferably steel) rings each of rectangular shape in cross section, of corresponding inner and outer diameters, and preferably of greater width than thickness. Opposed flat sides of the rings of each pair slidably engage each other and flat, axially inner ends of the innermost rings of each pair are at the junctures of said arch and said cylindrical portions. Suitable back-up means coact with the paired rings to oppose axially outward displacement thereof. Also, the inter-action of such rings, thus arranged, and their coaction with adjacent material of the joint, strongly opposes any tendency of the paired rings to shift and thereby rupture the joint, as a result of pressure within the expansion joint and its arch.

Description of the invention

The principal object of this invention is the provision of a stronger, economically manufactured expansion joint.

In an arch-type of expansion joint, such as is employed between lengths of pipe to permit expansion and contraction of the latter under varying temperature conditions, the parts least able to withstand pressure within the joint are the junctures between the arch and cylindrical portions adjoining opposite sides of the arch. This relative weakness, apparently, arises from the fact that the pressure within the joint is effective upon said junctures both radially and axially and in intermediate directions. As the resistance of said junctures to the effects of internal pressure is seldom, if ever, precisely uniform at all points around such a juncture, the internal pressure tends strongly to shift single reinforcement rings, hitherto used, by pushing them axially and laterally from their intended positions in the joint, or by tilting them relatively to the joint's axis, or by both such pushing and tilting.

Such shifting weakens surrounding plies of fabric within which the single reinforcing rings are embedded, leading to break down of the joint.

The present invention comprehends the use of pairs of similar intimately coaxially associated rectangular cross-sectional rings which are nondeformable and not materially expansible; each of said pairs being axially oblong in cross-section and the inner flat surfaces of the axially innermost ring of each pair being normal to the joint's axis and located at the said junctures.

Experience has shown that expansion joints with reinforcing rings according to this invention are stronger than joints of similar size having steel rings which are separated by deformable material which permits them to tilt and otherwise shift from the force of internal pressure.

It appears that the improved results arise from this invention largely because of the condition that in each pair of rings at opposite sides of the arch, the adjacent flat sides of the two members of the pair cause the ring of the pair which is distal from the arch to hold the other rings of the pair, located at the mentioned juncture, against any material tilting movement. The improved results also appear to be partly attributable to the fact that the outer surfaces of the paired rings are very substantial in area and are firmly bonded to ambient fabric plies, strongly to oppose undesirable axially outward shifting of said rings from pressure present within the arch.

A preferred embodiment of this invention is shown for illustrative purposes in the accompanying drawing without, however, limiting the invention to that particular embodiment.

The drawing is a side view of an expansion joint according to this invention as connected between the ends of fragmentarily shown pipes, the lower part of the drawing being in elevation and the upper part being in radial-axial section.

The principal parts of the illustrated expansion joint are a central, annular expansion arch 10, fluid-tightly connected by cylindrical portions 12, 12 to radially extending, connection flanges 14, 14 which are connected by bolts 16 to the connection flanges 18 of two related pipes 20.

The arch 10, cylindrical portions 12, and connection flanges 14 consist chiefly of plural plies 22 of suitable, strong, rubber-impregnated fabric material (the term "rubber" being employed throughout this specification and the accompanying claims to comprehend all suitable elastomeric materials).

Reinforcing means according to this invention are shown in the illustrated embodiment as being completely embedded in the cylindrical portions 12, between inner plies 22a and outer plies 22b of the fabric. These reinforcing means are similar at the opposite sides of the arch 10, hence, description of such means at one side of the arch should suffice herein.

The illustrated reinforcing means comprise a pair of similar or approximately similar circumferentially continuous or endless, preferably steel, rings 24, 26 of rectangular shape in cross section with their flat end surfaces normal to the main axis of the joint.

A first of the paired rings, numbered 24, is disposed with its innermost flat face at the juncture of the arch 10 and a cylindrical portion 12, said flat face preferably bearing axially inwardly against radially extending portions of inner plies 22a which portions are a part of the arch 10.

The second of the paired rings, numbered 26, is disposed with its innermost flat face bearing against the outermost flat face of ring 24.

The rings 24 and 26 are at least partly restrained against axially outward shifting by an annulus 28 which may be of rubber as illustrated or may be a spiral winding of rubber impregnated fabric tape. The annulus 28 bears against the outer flat face of ring 26 and extends into engagement with radially extending plies 22a of connection flange 14. Thus, the annulus 28 serves to block the paired rings 24, 26 against axially outward shifting.

A further restraint against such axial shifting is derived by suitably treating all surfaces of the paired rings 24, 26, excepting their interengaging flat surfaces, to enhance adhesion of said rings to ambient rubber and fabric of the plies 22. Such treatment may preferably be the application of suitable adhesive material to the surfaces of the rings 24, 26 to be treated.

The expansion joint would normally and preferably be made with an homogeneous, impervious lining 30 to protect other parts of the joint from being affected through action of the contained fluid. Said lining may particularly advantageously be made of fluorinated ethylene propylene or equivalent fluorocarbon plastic material to provide protection for other parts of the joint even where strongly corrosive fluids may be carried through the joint.

Optionally, the joint may include interior layers or plies 32, 34 of rubber extending within the arch 10 and the cylindrical portions 12. A smooth outer surface is given to the joint by an outer layer 36 of rubber.

The described constituents are assembled upon a suitable mandrel, whereafter the entire structure is cured in order to vulcanize the rubber which initially is in uncured condition. Such vulcanization causes cohesion of the various plies or layers of material in the joint and enhances the adhesion of the rings 24, 26 to ambient rubber and rubber impregnated fabric.

It may be noted that the paired rings 24, 26 are not caused to adhere to each other but merely bear firmly against each other. It appears that this condition plays an important part in yielding the improved service derivable from expansion joints according to this invention.

As the strength of the arch 10 is not ordinarily absolutely uniform at all circumferential points, the pressure within the arch and other parts of the joint tends to cock the ring 24 relatively to the joint's axis. Such cocking would lead to breakdown of the joint.

However, as the paired rings 24, 26 are quite firmly but, nevertheless, somewhat yieldably, bound together by rubber and rubber-impregnated fabric which extends within and also around said rings, the ring 24 may slide radially almost imperceptably on the other ring 26 of the pair while remaining in full face-to-face engagement with the latter ring. Even in the presence of such sliding, the ring 26 serves to prevent any cocking of the ring 24 which would be so detrimental to the service capability of the joint.

If the rings 24 and 26 were not separate and relatively slidable, the effect would be as of a single steel ring which, with only rubber or other yieldable backing, would be quite free to become cocked relatively to the joint's axis leading to breakdown of the joint.

The interengaging surfaces of the paired rings 24 and 26 should be such as to permit the mentioned relative sliding. Thus, those surfaces may be made very smooth and may be suitably lubricated; or a thin, annular wafer of self lubricating material such as, for example, polytetrafluoroethylene may be disposed between the paired rings.

It should be apparent that the disclosed inventive concept may be practised in other ways without departing from the invention.

I claim:

1. An expansion joint comprising plural plies of rubber-impregnated fabric, forming a carcass which comprises an annular, axially expansible arch having spaced radial walls defining a radially inwardly facing pressure containing area, cylindrical portions coaxially adjoining radially inner portions of said walls at opposite sides of said arch, connection means at outer ends of said cylindrical portions for connecting the joint to related pipe portions, and reinforcing means associated with said cylindrical portions; said reinforcing means in each of said cylindrical portions comprising a cross-sectionally, axially oblong pair of circumferentially continuous, substantially non-expansible and non-deformable reinforcing rings each of rectangular shape in cross section, and of similar inside and outside diameters, said paired rings being disposed between and adhesively engaged with inner and outer plies of said fabric in side by side sliding interengagement with each other at opposed flat surfaces of said rings, which surfaces extend normally to the longitudinal axis of the joint, an inner flat surface of the axially innermost of the paired rings being located at a juncture of said arch with the cylindrical portion of the joint in which said paired rings are located, and the joint further including back-up means coacting with an outer flat surface of the axially outermost of the paired rings to oppose axially outward shifting of the paired rings.

2. An expansion joint according to claim 1, said inner flat surface of the axially innermost of the paired rings bearing against a radially extending portion of one of said fabric plies in each arch.

3. An expansion joint according to claim 1, all surfaces of the paired rings, excepting said interengaging, opposed flat surfaces, being treated to enhance their capability of adhering to adjacent parts of the joint.

4. An expansion joint according to claim 1, all surfaces of the paired rings, excepting said interengaging, opposed flat surfaces, being coated with adhesive material to enhance their capability of adhering to adjacent parts of the joint.

5. An expansion joint according to claim 1, said rings of each pair being of greater width than thickness.

References Cited

UNITED STATES PATENTS

| | | | |
|---|---|---|---|
| 1,696,435 | 12/1928 | Fraley | 138—138 X |
| 2,879,804 | 3/1959 | Hammond | 285—229 X |
| 2,953,618 | 9/1960 | Buono et al. | 285—229 X |
| 2,998,986 | 9/1961 | Buono | 285—229 X |
| 3,051,512 | 8/1962 | Cranston | 285—229 X |
| 3,318,339 | 5/1967 | Stowell et al. | 138—138 |
| 3,363,918 | 1/1968 | Fisher | 285—229 |

FOREIGN PATENTS 649,199    9/1962    Canada.

CARL W. TOMLIN, *Primary Examiner.*

THOMAS F. CALLAGHAN, *Assistant Examiner.*

UNITED STATES PATENT OFFICE
CERTIFICATE OF CORRECTION

Patent No. 3,429,592 February 25, 1969

Joseph Merkwacz

It is certified that error appears in the above identified patent and that said Letters Patent are hereby corrected as shown below:

Column 4, line 24, "each" should read -- said --.

Signed and sealed this 24th day of March 1970.

(SEAL)
Attest:

Edward M. Fletcher, Jr.

Attesting Officer

WILLIAM E. SCHUYLER, JR.

Commissioner of Patents